United States Patent

De Stefano et al.

[11] 3,912,203
[45] Oct. 14, 1975

[54] ROCKET CATAPULT AIRCRAFT ESCAPE ARRANGEMENT

[75] Inventors: Leonard A. De Stefano, Upper Darby; Osyp Nimlowycz, Philadelphia, both of Pa.

[73] Assignee: The United States of America as represented by the Secretary of the Army, Washington, D.C.

[22] Filed: Jan. 2, 1974

[21] Appl. No.: 538,300

[52] U.S. Cl. ......... 244/122 AD; 89/1.806; 89/1.818; 244/141
[51] Int. Cl.² .......................................... B64D 25/08
[58] Field of Search ...... 244/122 AD, 122 AB, 141, 244/138 R; 89/1.806, 1.807, 1.818

Primary Examiner—Trygve M. Blix
Assistant Examiner—Barry L. Kelmachter
Attorney, Agent, or Firm—Nathan Edelberg; Robert P. Gibson

[57] ABSTRACT

A rocket catapult emergency aricraft escape arrangement in which the pendant line, interconnecting the booster tube with an escapee's shoulder harness, becomes taut prior to rocket motor ignition and in which rocket nozzle combustion products are not exhausted in the vicinity of the pendant line or the ejectee. The booster tube, containing a propellant cartridge and a centrally apertured enlarged piston telescopingly supports a launch tube that slidingly receives the piston and has an expansion chamber and lateral ports in its forward end, and an inwardly directed flange at its rearward end for abutting the piston. The nozzle portion of the rocket motor, initially secured to a pedestal by a rupturable bolt having a pre-weakened section, is slidable with the launch tube on the booster tube until the pendant line becomes taut and a shear ring, initially precluding relative longitudinal motion between the rocket motor and launch tube, fails so as to enable the rocket to advance a predetermined distance along the launch tube and uncover the ports for igniting the main rocket grain to eject the escapee with the entire rocket catapult assembly. An apertured lug member, secured to the booster tube and connected to the pendant line, is slidably mounted in the pedestal which remains attached to the aircraft supporting structure.

5 Claims, 5 Drawing Figures

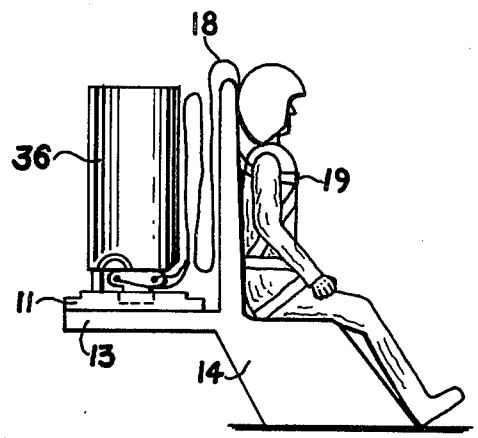
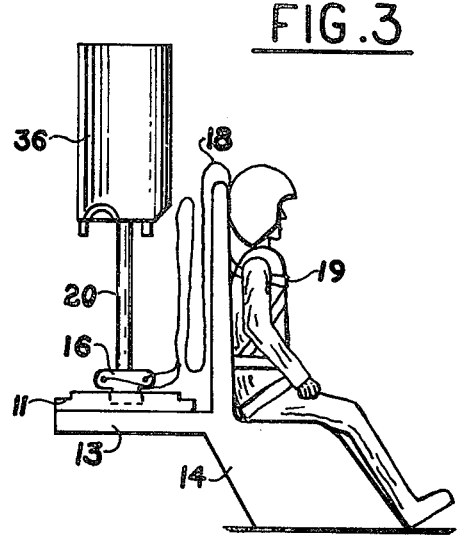
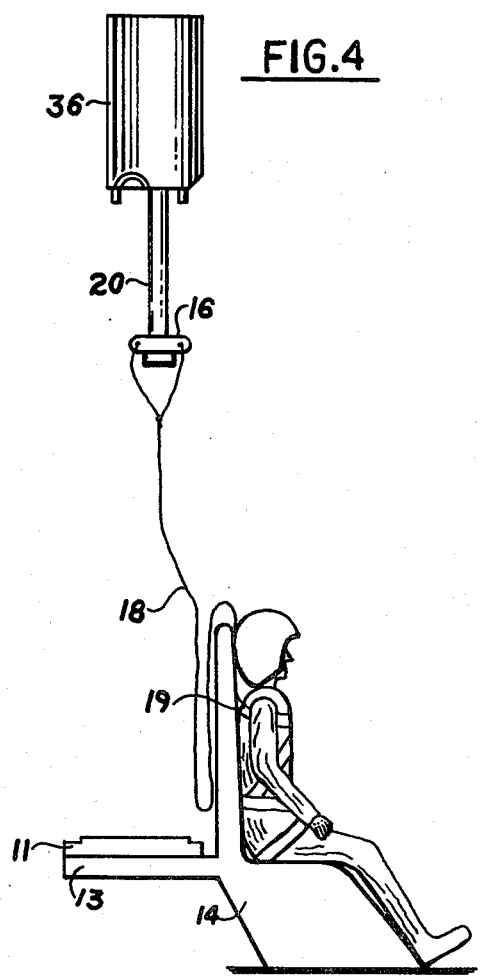
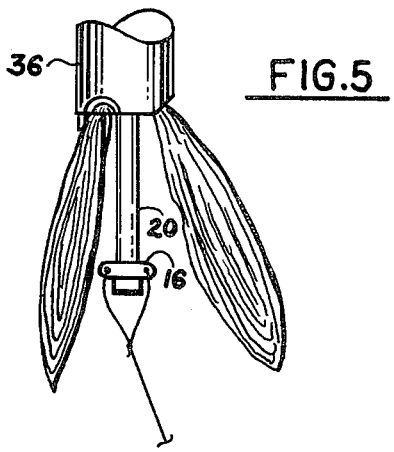
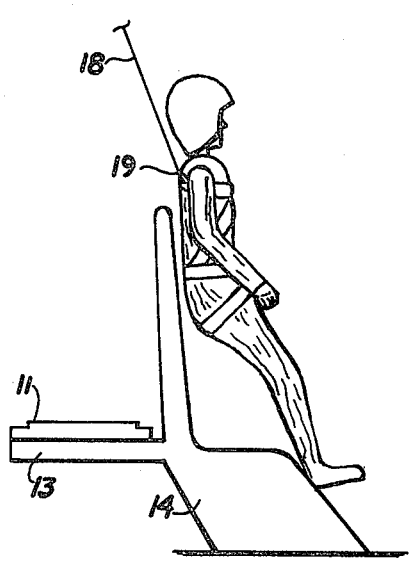

ROCKET CATAPULT AIRCRAFT ESCAPE ARRANGEMENT

The invention described herein may be manufactured, used and licensed by or for the Government for governmental purposes without the payment to us any royalty thereon.

This invention relates to rocket motors, and more particularly to a rocket catapult emergency aircraft escape arrangement in which the escapee is ejected or extracted from a disabled aircraft.

It is an object of the invention to provide a rocket catapult emergency aircraft escape arrangement in which the weight of the escapee and his taut pendant line actuate the main rocket grain ignition.

Another object of the invention is to provide such an arrangement in which the chance of potential damage caused by rocket exhaust is minimized.

A further object of the invention is to provide such an arrangement in which the nozzle angle may be efficiently reduced, resulting in a more axial and efficient thrust and in minimizing the weight of required rocket grain propellant.

These and other objects, features and advantages will become more apparent from the following description and accompanying drawings in which:

FIGS. 2, 3, 4 and 5 are elevational views of a sequential operation of the FIG. 1 arrangement.

Figure 1:
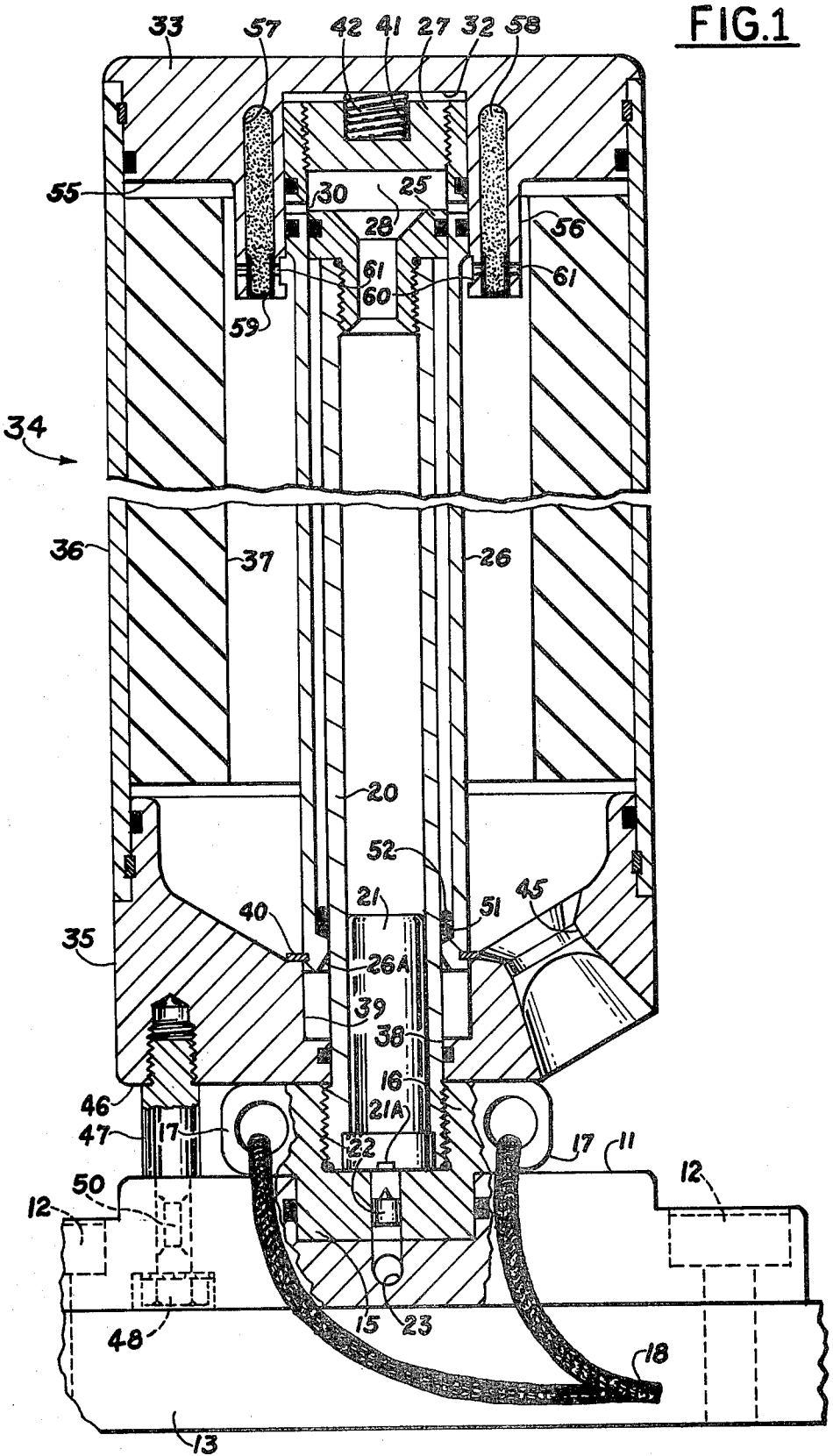
FIG. 1 is an elevantional sectional view, partially broken away of a preferred rocket catapult emergency aircraft escape arrangement embodying the principles of the invention.

The mounting plate or pedestal 11 is suitably secured by appropriate bolts 12, shown in phantom (FIG. 1), to an aircraft supporting structure 13, preferably a horizontal rearward projection on the occupant's seat structure 14 (FIGS. 2, 3, 4, 5). An upwardly opening recess in the pedestal 11 contains a suitable O-ring seal and slidably receives and seats the lower cylindrical protection 15 of mounting lug member 16 that has a pair of diametrically opposed, apertured ears 17 by which the pendant line 18 connects therewith the seat occupant's shoulder harness 19. Member 16 has an upwardly opening tapped recess in which is secured the lower or rearward portion of booster tube 20 that carries a launcher propellant cartridge 21. The primer 21A of cartridge 21 is initiated, in response to emergency actuation of a suitable control means (not shown), by a pressure gas actuated firing pin 22 slidably mounted in a central passage of projection 15 that is in fluid communication with a lateral pressure gas supply conduit 23 located in the pedestal.

The cylindrical booster tube 20 of the rocket catapult assembly has a centrally apertured, enlarged cylindrical piston member 25 thready and sealingly secured to its forward end. Piston 25 contains an appropriate O-ring in its peripheral cylindrical surface upon which the internal surface of cylindrical launch tube 26 is slidably mounted, and a rearmost inwardly directed annular flange 26A on launch tube 26 is slidably mounted on the external surface of booster tube 20. An end plug 27 is thradedly secured in a forwardmost tapped internal surface of launch tube 26 defining an expansion chamber 28 between the piston 25 and plug 27. The forward sidewall of the launch tube 26 has a plurality of circumferentially spaced lateral ports 30 that are at all times in fluid communication with expansion chamber 28. The forward external surface of launch tube 26 carries a longitudinally spaced pair of O-rings respectively located forwardly and rearwardly adjacent the lateral openings 30, and is slidably mounted in a central, rearwardly opening cylindrical recess 32 provided in the forwardmost rocket head portion 33 of the rocket motor, shown generally at 34. The rocket motor includes a rearmost nozzle portion 35 and an intermediate elongated cylindrical rocket motor tubular portion 36 carrying an annular elongated rocket propellant grain 37. The rocket nozzle portion 35 has a central opening 38 in its base or rearmost end that carries a suitable O-ring and is slidably mounted on booster tube 20, as well as a central forwardly opening recess 39 of predetermined depth for slidably receiving the rearward end of launch tube 26 which is assembled in the upper or forward portion of the recess 39 to the extent permitted by laterally extending annular shear ring 40 seated in an appropriate groove in the rearward peripheral sidewall portion of launch tube 26. End plug 27 has a forwardly opening recess 41 containing compression spring 42 that contacts the base of recess 32 and biases the rocket nozzle portion 35 forwardly against shear ring 40 in the pre-fired condition of the rocket catapult assembly as viewed in FIG. 1, whereby the shear ring 40 precludes forward longitudinal motion of the rocket motor on the launch tube 26.

The rocket nozzle portion 35 preferably has three rocket gas exhaust nozzles 45 each having the same predetermined exhaust or exit angle of thrust and located circumferentially equidistant (120°) from each other on the transverse rearward surface 46 of rocket nozzle portion 35. Diametrically opposite each rocket nozzle 45, the surface 46 has a rearwardly opening tapped hole in which is secured the reduced forward threaded end of a corresponding tension rod or stud member 47 of predetermined length and contour. The rod 47 has a lower threaded end that receives an appropriate lock washer and nut 48 (shown in phantom) to initialy secure the rocket catapult assembly to the pedestal 11. The lower portion of each tension rod 47 has a pre-weakened or reduced portion 50, also shown in phantom, that ruptures upon ignition of cartridge 21 and production of pressure gas in expansion chamber 28, thus enabling the launch tube 26 and the rocket motor to unitarily move forward along the booster tube with a shot start effect during the catapult stroke or phase of operation. A pair of O-rings 51, 52 mounted within the launch tube 26 adjacent flange 26A serve as shock absorbing means at the completion of the catapult stroke when flange 26A strikes piston 25.

The rearward outer end of rocket motor head portion 33 has a annular recess 55 to accomdate the forward end of rocket propellant grain 37 and with recess 32, define therebetween a rearwardly extending annulus 56. Annulus 56 has a rearwardly opening annular cavity 57 filled with an auxilliary igniter 58 and capped with rupturable annular plastic plug insert 59. The sidewall of rocket head central recess 32, which initially covers the launch tube openings 30, has a rearward inwardly opening annular groove 60. A plurality of circumferentially spaced lateral passages 61 extend through the annulus 56 and intersect the base of groove 60, thus enabling developed pressure gas to flow from ports 30 into groove 60 and its passages 61, (in the wall common to cavity 57 and recess 32) for rupturing insert 59 and ignition of auxilliary igniter 58, when the groove 60 overlies or is in fluid communication with launch tube openings 30. Preferably, the longitudinally offset distance between the centers of openings 30 and passages 61, as viewed in FIG. 1, is equal to the distance between the rearward end surface of launch tube 26 and the base of nozzle portion recess 39 in which it will seat during the rocket phase of operation. The auxilliary igniter 58 will in turn ignite the main rocket propellant grain 37.

After the pre-operational rocket cataput assembly (FIGS. 1 and 2) has moved to the end of the aforementioned catapult phase of operation (FIG. 3), its forward or upward momentum will rapidly elevate the entire assembly away from pedestal 11 as the slack in pendant line 18 is quickly taken up (FIG. 4). At the moment the pendant line becomes taut, the weight of the ejectee in harness 19 will cause the shear ring 40, extending in the path of nozzle portion 35, to fail and the rearward end of launch tube 26 will quickly bottom in rocket nozzle recess 39, thus fluidally communicating rocket head groove 60 with expansion chamber 28 to sequentially ignite the auxilliary igniter 58 and main rocket grain 37 for sustained rocket phase operation (FIG. 5).

Various modifications, alterations or changes may be resorted to without departing from the scope of the invention as defined in the appended claims.

We claim:

1. In an aircraft emergency escape system having a pedestal attached to an aircraft support member and supporting a rocket catapult assembly, said rocket catapult assembly having a booster tube slidably mounted relative to said pedestal, said booster tube having a launcher propellant cartridge in a rearward end thereof and a centrally apertured, enlarged piston member secured to its forward end, a launch tube slidably receiving said piston member and having an inwardly directed flange at its rearward end for abutting said piston member and lateral openings in its forward end, a rocket motor having a forward head portion slidably mounted on said launch tube and initially covering said lateral openings, a rearward nozzle portion slidably mounted on said booster tube, and an intermediate rocket grain tubular portion, said head portion carrying an auxilliary igniter, said nozzle portion having a central recess slidably receiving a rearward portion of said launch tube, rupturable means initially securing said rocket motor to said pedestal, a shear ring on said launch tube initially precluding forward longitudinal motion of said rocket motor on said launch tube, and means on said booster tube for connection to a pendant line of a seat occupant's shoulder harness.

2. The structure in accordance with claim 1 wherein said rupturable means includes a rod having a preformed weakened section that ruptures after ignition of said propellant cartridge, thereby enabling said launch tube and rocket motor tube to unitarily move forward along said booster tube.

3. The structure according to claim 2 wherein said shear ring extends outwardly in the path of said rocket nozzle portion and said shear ring will fail upon said pendant line becoming taut.

4. The structure of claim 3 wherein said rocket head portion has a rearwardly opening annular cavity containing said auxiliary igniter and surrounding a rocket head central rearwardly opening recess, the common wall of said rocket head recess and cavity having a plurality of circumferentially spaced lateral passages therethrough, said passages being in fluid communication with said launch tube openings when said launch tube seats in said nozzle portion recess.

5. The structure according to claim 4 wherein said launch tube contains a forwardmost end plug, the forward surface of said end plug having a recess, and a compression spring seated in said end plug recess and being in contact with the base of said rocket head recess.

* * * * *